Figure 1:
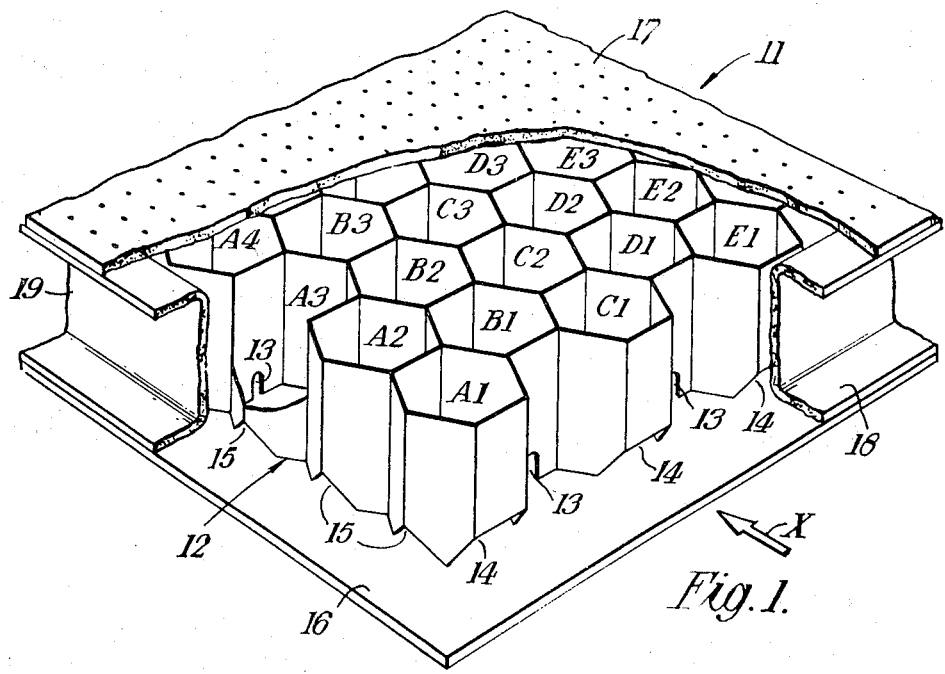

United States Patent [19]
Scott

[11] 3,769,767
[45] Nov. 6, 1973

[54] COMPOSITE PANEL STRUCTURES

[75] Inventor: Joseph James Scott, Newtownards, Northern Ireland

[73] Assignee: Short Brothers & Harland Limited, Belfast, Northern Ireland

[22] Filed: July 9, 1971

[21] Appl. No.: 161,066

[30] Foreign Application Priority Data
July 10, 1970 Great Britain............... 33711/70

[52] U.S. Cl....................... 52/145, 52/615, 52/618
[51] Int. Cl............................................ E04c 2/36
[58] Field of Search...................... 52/618, 615, 145

[56] References Cited
UNITED STATES PATENTS

| | | | |
|---|---|---|---|
| 2,809,403 | 10/1957 | MacMillan | 52/615 |
| 2,959,257 | 11/1960 | Campbell | 52/615 |
| 3,021,916 | 2/1962 | Kemp | 52/615 |
| 3,084,770 | 4/1963 | Wirsing | 52/615 |
| 3,501,367 | 3/1970 | Parker | 52/615 |
| 2,814,717 | 11/1957 | Hardesty | 52/618 |
| 3,529,393 | 9/1970 | Wilkins | 52/618 |

FOREIGN PATENTS OR APPLICATIONS

| | | | |
|---|---|---|---|
| 206,535 | 5/1955 | Australia | 52/145 |
| 649,311 | 10/1964 | Belgium | 52/618 |
| 705,518 | 5/1965 | Canada | 52/618 |
| 817,808 | 9/1937 | France | 52/615 |
| 1,011,981 | 7/1952 | France | 52/615 |
| 56,910 | 5/1967 | Germany | 52/615 |

*Primary Examiner*—Frank L. Abbott
*Assistant Examiner*—H. E. Raduazo
*Attorney*—Cushman, Darby & Cushman

[57] ABSTRACT

A composite structure manufactured from a cellular core formed by a plurality of rows of contiguous cells by cutting away from each of the end cells forming an edge of the core a portion or portions thereof. The edge of the core is closed by a flat edge member so that the cut-away portions provide a passage along the edge cellular core. Each cell of a row is provided with a communicating aperture to an adjacent cell of the row or each adjacent cell of the row. The cellular core is sandwiched between two facing sheets. In this way a panel is formed in which water can pass through the cellular core of the panel by way of the passages and apertures to a point at which a drain hole is provided.

2 Claims, 3 Drawing Figures

COMPOSITE PANEL STRUCTURES

The present invention relates to the manufacture of composite structures and is particularly though not exclusively concerned with the manufacture of panels consisting of a cellular core and a facing sheet secured to one or each face of the core, with particular reference to noise attenuating panels for use on aircraft engines.

A cellular core commonly employed for noise attenuating panels is of honeycomb configuration, that is to say, is formed by cells of hexagonal cross-section and open at each end. The walls forming each cell in the body of the core constitute also the walls of adjacent cells, the cells forming rows of contiguous cells extending in a straight line across the core.

It has been found necessary to provide for drainage of water which may collect within the cells of such cores and where the panel is one in which the cells of the core become closed by a facing sheet or facing sheets in the formation of the panel it has been proposed to form a slot in the wall between each pair of adjacent cells in each row so as to provide a continuous passage for water along a row of cells. Since there will in this arrangement be no passage between each row and its adjacent row or rows an outlet passage needs to be provided at the end of each row and a slot is therefore also cut in the end wall of each of the two end cells of the row. It is, however, sometimes necessary for the structural strengthening of the panel or for facilitating its mounting to secure an edge member to the edges of the panel and it frequently happens that the end slots are closed thereby and drainage from each row prevented.

It is an object of the present invention to provide a cellular core for a noise attenuating panel, which does not suffer from the above-mentioned disadvantage.

According to one apsect of the present invention, there is provided a composite structure comprising a cellular core formed by a plurality of rows of contiguous cells in which each cell of a row is provided with a communicating passage to an adjacent cell of the row or each adjacent cell of the row and in which the end cells defining an edge of the core are formed with passages which provide a communication between each end cell and an adjacent end cell or each adjacent end cell which passages are left unobstructed when a flat edge member is seucred to the end cells throughout the depth of the core.

According to another apsect of the present invention, there is provided a method of manufacturing a composite structure having a cellular core formed by a plurality of rows of contiguous cells, comprising the step of cutting away from each of the end cells forming an edge of the core a portion or portions of the wall thereof to provide a passage along the edge of the core when the edge is closed by a flat edge member engaging the walls of the end cells. Preferably, the passage is formed in a single machining operation from a cellular core blank of greater area than the cellular core, the cellular core blank being initially cut with V-shaped slots extending along lines which determine the perimeter of the cellular core to be made, the blank then being cut through along the bases of the V-shaped slots to form said cellular core.

Figure 2:
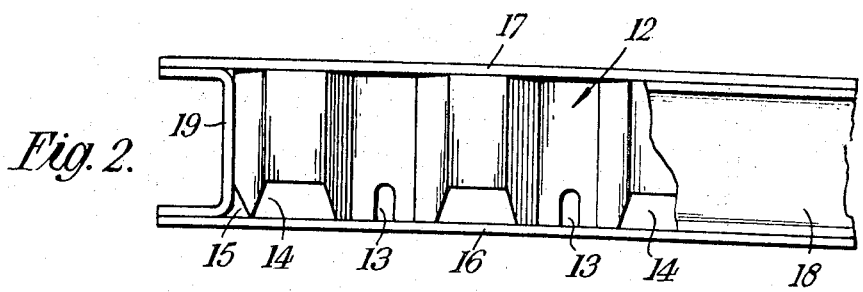
Figure 3:
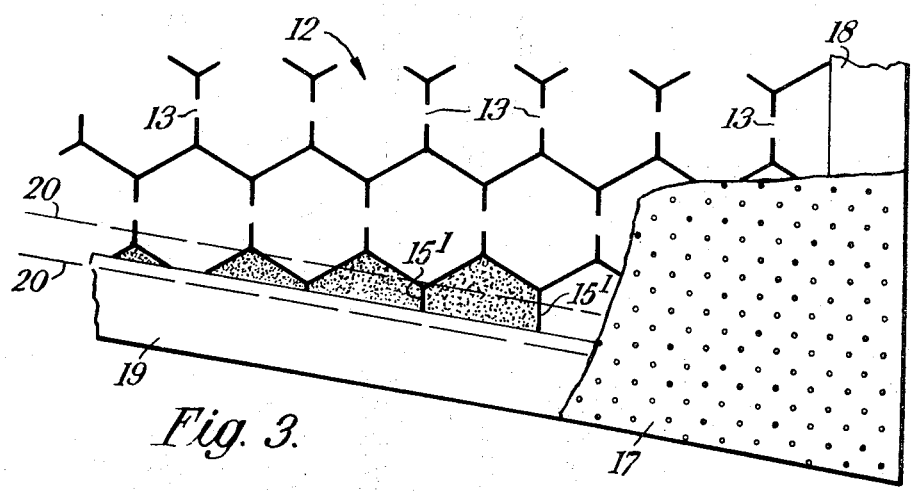

Some embodiments of the invention will now be described by way of example with reference to the accompanying drawings in which:

FIG. 1 is a schematic perspective view of a noise attenuating panel according to a first embodiment of the invention, with parts thereof broken away for clarity, FIG. 2 is an end elevation of a part of the panel shown in FIG. 1 as viewed in the direction indicated by the arrow X in FIG. 1, and FIG. 3 is a schematic plan view of a noise attenuating panel according to a second embodiment of the invention, with parts thereof removed for clarity.

Referring first to FIG. 1 of the drawings, a noise attenuating panel 11 is manufactured according to the invention from a core 12, which has a honeycomb open cellular structure and which comprises a plurality of rows of cells A1, A2, A3 . . . ; B1, B2, B3 . . . ; C1, C2, C3 . . . . The partition wall between each cell of a row and the next cell of the row is formed at its lower most end with a slot which is of the configuration of the slot 13 which is formed in the end wall of each of the end cells A1, B1, C1 . . . . The lowermost ends of alternate end cells A1, C1, E1 . . . are cut away as shown at 14, while the end cells A1, A2, A3 . . . are cut away as shown at 15. The row of end cells at the other edge of the core and corresponding to the row of end cells A1, A2, A3 . . . are likewise cut away as at 15 and also alternate end cells at the edge of the core remote from the end cells A1, C1, E1 . . . are likewise cut away as at 14.

The core 12 has secured thereto an impervious sheet 16 and to its other face a perforated sheet 17, and the edges of the core are closed by channel-shaped edge members 18 and 19, the channel member 18 extending throughout the length of one edge of the core and the channel member 19 extending throughout the length of an adjacent edge of the core. Channel members corresponding to the members 18 and 19 extend along the lengths of the other two adjacent edges of the core.

By so cutting away the lowermost ends of the end cells, any water which drains to the end cell in any row may find its way along the edge of the core to a lowermost point where a drainage hole is provided either in the channel member or in one of the facing sheets.

In a preferred manner of manufacturing the panel shown in FIG. 1, a core blank formed with a plurality of rows of slots 13 is first subject to a machining operation which cuts slots of V-shape along the lines of the blank which predetermine the shape and size of the core from which the panel is to be constructed. The core is then cut from the blank by cutting through it along the bottom of the V-shaped slots formed thereon. The V-shaped slots may be cut with a high speed milling cutter and a bandsaw may be used to cut through the blank along the base of the slots. The machining may be carried out without individual support for the cell walls, as 2 or 3 inches of core can always be provided outside the cutting line to give the necessary support during cutting.

It will be appreciated that the panel need not be of rectangular form and that in many instances panels of irregular outline need to be provided. The components of the panel may nevertheless be of the same general form as that illustrated in FIG. 1, the core being cut from a blank in the same manner but in such a way as to provide the required irregular shape. For example, in the embodiment of the invention illustrated in FIG. 3, one edge of the core is inclined to an adjacent edge at an angle slightly less than 90°. The core in this embodiment is cut from a blank formed with a plurality of rows of slots 13, first by machining V-shaped slots along lines determining the perimter of the required core, the edges of one of the slots being indicated by the reference numeral 20, and then cutting through the bottom of the V-shaped slots to produce the core illustrated. The facing sheets of appropriate shape may be applied to the core in the same manner and the channel-section edge members secured to the edges of the core to produce the finished panel. The parts of the cells shown speckled in FIG. 3 will readily drain along the channel provided by the cut-away portion 15', but in the absence of the channel would remain undrained.

It will be appreciated that the core may be made up from cells having a shaped other than hexagonal and the same advantages obtained by forming the core according to the invention.

What is claimed is:

1. A composite structure, comprising:
 a. a cellular core formed by a plurality of rows of means defining contiguous cells;
 b. means defining communicating apertures connecting each cell which is surrounded by contiguous others of said cells, with each said cell contiguous therewith that is in the same row;
 c. means defining a cut-away portion of each edge of the plurality of rows of means defining contiguous cells;
 d. two facing sheets abutting the two respective opposite ends of the cells to sandwich the core therebetween, only one of these sheets being perforated;
 e. edge member means placed flatwise about the periphery of the core and extending between the two facing sheets to complete enclose of the core;
 f. drainage passage means defined between the cut-away portions, the edge members and one of the two facing sheets;
 g. means defining at least one drain hole formed in the facing sheets and edge members and communicating with the drainage passage means to drain liquid entering the structure and passing to the drainage passage.

2. A composite sound absorbing structure for a gas turbine engine comprising a cellular core formed by a plurality of rows of means defining contiguous hexagonal, honeycomb fashion, cells; means defining communicating apertures connecting each cell which is surrounded by contiguous others of said cells with each said cell contiguous therewith that is in the same row and arranged at one end of each cell; two facing sheets abutting the two respective opposite ends of the cells to sandwich the core therebetween, only one of these sheets being perforated; edge member means placed flatwise about the periphery of the core and extending between the two facing sheets to complete enclosure of the core; the periphery of the core, next to one of said sheets and next to the edge member means, being obliquely bevelled; drainage passage means defined between the oblique bevels, the edge members of one of the two facing sheets; and means defining at least one drain hole formed in the facing sheets and edge members and communicating with the drainage passage means to drain liquid entering the structure through the perforated facing sheets and passing to the drainage passage through the means defining communicating apertures connecting the cells of a row.

* * * * *